United States Patent
Yabusaki

(10) Patent No.: US 10,030,730 B2
(45) Date of Patent: Jul. 24, 2018

(54) VEHICLE BRAKE SYSTEM AND METHOD OF DETECTING WEAR OF FRICTION MEMBER

(71) Applicant: TOYOTA JIDOSHA KABUSHIKI KAISHA, Toyota-shi, Aichi-ken (JP)

(72) Inventor: Naoki Yabusaki, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 52 days.

(21) Appl. No.: 15/419,640

(22) Filed: Jan. 30, 2017

(65) Prior Publication Data

US 2017/0276199 A1    Sep. 28, 2017

(30) Foreign Application Priority Data

Mar. 28, 2016 (JP) ................. 2016-064356

(51) Int. Cl.
*F16D 66/02* (2006.01)
*B60T 17/22* (2006.01)
*F16D 55/226* (2006.01)
*F16D 55/225* (2006.01)
(Continued)

(52) U.S. Cl.
CPC .......... *F16D 66/026* (2013.01); *B60T 17/221* (2013.01); *F16D 55/226* (2013.01); *F16D 55/225* (2013.01); *F16D 2066/003* (2013.01); *F16D 2066/005* (2013.01); *F16D 2121/24* (2013.01)

(58) Field of Classification Search
CPC .... F16D 66/021; F16D 66/026; F16D 55/224; F16D 55/225; F16D 55/226; F16D 2066/003; F16D 2066/005; F16D 2121/24; B60T 17/221

See application file for complete search history.

(56) References Cited

U.S. PATENT DOCUMENTS

| | | | |
|---|---|---|---|
| 2012/0193177 A1 | 8/2012 | Goto et al. | |
| 2017/0002881 A1* | 1/2017 | Masuda | F16D 65/18 |
| 2017/0009834 A1* | 1/2017 | Masuda | F16D 65/18 |

FOREIGN PATENT DOCUMENTS

| | | |
|---|---|---|
| DE | 102012201323 A1 | 8/2012 |
| JP | H07-156780 A | 6/1995 |
| JP | H11-280799 A | 10/1999 |

(Continued)

*Primary Examiner* — Melanie Torres Williams
(74) *Attorney, Agent, or Firm* — Oliff PLC

(57) ABSTRACT

A vehicle brake system, including: an electric brake device including a friction member, a rotor, a motor, and a driven member; and a wear detector including a data obtaining section to obtain a forward movement amount of the driven member and a pressing force by which the driven member presses the friction member, a detecting section to detect a contact start position of the driven member, and an estimating section to estimate a remaining thickness of the friction member, wherein the wear detector includes an uneven-wear detecting section to detect uneven wear of the friction member, by comparing: a relationship between the forward movement amount and the pressing force; and a relationship therebetween in a case where it is supposed that a thickness of the friction member is equal to the remaining thickness that would be estimated in a state in which the friction member is evenly worn.

6 Claims, 7 Drawing Sheets

(51) Int. Cl.
*F16D 66/00* (2006.01)
*F16D 121/24* (2012.01)

(56) References Cited

FOREIGN PATENT DOCUMENTS

| | | | |
|---|---|---|---|
| JP | 2001225741 | A | 8/2001 |
| JP | 2005-076783 | A | 3/2005 |
| JP | 2005-106153 | A | 4/2005 |
| JP | 4191871 | B2 | 12/2008 |
| JP | 2014-177206 | A | 9/2014 |
| JP | 2015-021508 | A | 2/2015 |
| JP | 2015-182534 | A | 10/2015 |
| JP | 2015-187483 | A | 10/2015 |

* cited by examiner

VEHICLE BRAKE SYSTEM AND METHOD OF DETECTING WEAR OF FRICTION MEMBER

CROSS REFERENCE TO RELATED APPLICATION

The present application claims priority from Japanese Patent Application No. 2016-064356, which was filed on Mar. 28, 2016, the disclosure of which is herein incorporated by reference in its entirety.

BACKGROUND

Technical Field

The following disclosure relates to a vehicle brake system having an electric brake device that uses a motor as a power source, and in particular to a wear detector configured to detect wear of a friction member of the electric brake device.

Description of Related Art

JP-A-2015-187483 discloses an electric brake device including (a) a friction member, (b) a rotor configured to rotate with a wheel, (c) a motor as a power source, and (d) a driven member configured to be moved forward and backward by the motor. The electric brake device is configured to generate a braking force such that the driven member is moved forward by the motor and the friction member is brought into contact with the rotor. JP-A-2015-187483 describes a wear detector configured to detect a degree of wear of the friction member so as to detect wear of the friction member.

SUMMARY

In the system disclosed in JP-A-2015-187483, an amount of wear of the friction member is estimated by comparing: a relationship between a motor rotation angle detected by a motor rotation angle detecting means and a braking force estimated by a braking force estimating means; and a relationship between a motor rotation angle and a braking force in a situation in which the friction member is not worn. The mere comparison of the relationship obtained based on a current state of the friction member with the relationship in the situation in which the friction member is not worn may cause a risk that the wear of the friction member cannot be accurately detected. In view of the situation, an aspect of the disclosure relates to a method of detecting wear of a friction member that ensures an improved detection capability of the wear of the friction member. Further, another aspect of the disclosure relates to a vehicle brake system including an electric brake device and a wear detector that ensures an improved detection capability of the wear of the friction member.

One aspect of the disclosure relates to a vehicle brake system including:

an electric brake device including (a) a friction member, (b) a rotor configured to rotate with a wheel, (c) a motor as a power source, and (d) a driven member configured to be moved forward and backward by the motor, the electric brake device being configured to generate a braking force such that the driven member is moved forward by the motor so as to press the friction member and the friction member is brought into contact with the rotor; and a wear detector configured to detect wear of the friction member and including (A) a data obtaining section configured to obtain an amount of a forward movement of the driven member corresponding to a distance by which the driven member moves forward and a pressing force by which the driven member presses the friction member, (B) a contact-start-position detecting section configured to detect a contact start position at which the driven member is located when the friction member starts to contact the rotor, and (C) a remaining-thickness estimating section configured to estimate a remaining thickness of the friction member based on the contact start position detected by the contact-start-position detecting section, wherein the wear detector further includes an uneven-wear detecting section configured to detect uneven wear of the friction member indicative of a state in which the friction member is unevenly worn, by comparing: a relationship between the amount of the forward movement and the pressing force obtained by the data obtaining section; and a relationship between an amount of the forward movement and a pressing force in a case where it is supposed that a thickness of the friction member is equal to the remaining thickness that would be estimated by the remaining-thickness estimating section in a state in which the friction member is evenly worn.

Another aspect of the disclosure relates to a method of detecting wear of a friction member in an electric brake device including (a) a friction member, (b) a rotor configured to rotate with a wheel, (c) a motor as a power source, and (d) a driven member configured to be moved forward and backward by the motor, the electric brake device being configured to generate a braking force such that the driven member is moved forward by the motor so as to press the friction member and the friction member is brought into contact with the rotor, the method including:

obtaining an amount of a forward movement of the driven member corresponding to a distance by which the driven member moves forward and a pressing force by which the driven member presses the friction member;

detecting a contact start position at which the driven member is located when the friction member starts to contact the rotor;

estimating a remaining thickness of the friction member based on the detected contact start position; and detecting uneven wear of the friction member indicative of a state in which the friction member is unevenly worn, by comparing: a relationship between the obtained amount of the forward movement and the obtained pressing force; and a relationship between an amount of the forward movement and a pressing force in a case where it is supposed that a thickness of the friction member is equal to the remaining thickness that would be estimated in a state in which the friction member is evenly worn.

According to the vehicle brake system and the method of detecting wear of the friction member described above, it is possible to detect uneven wear of the friction member that cannot be detected from the remaining thickness of the friction member estimated based on the contact start position, thus enabling accurate detection of wear of the friction member.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

EMBODIMENT

Figure 1:
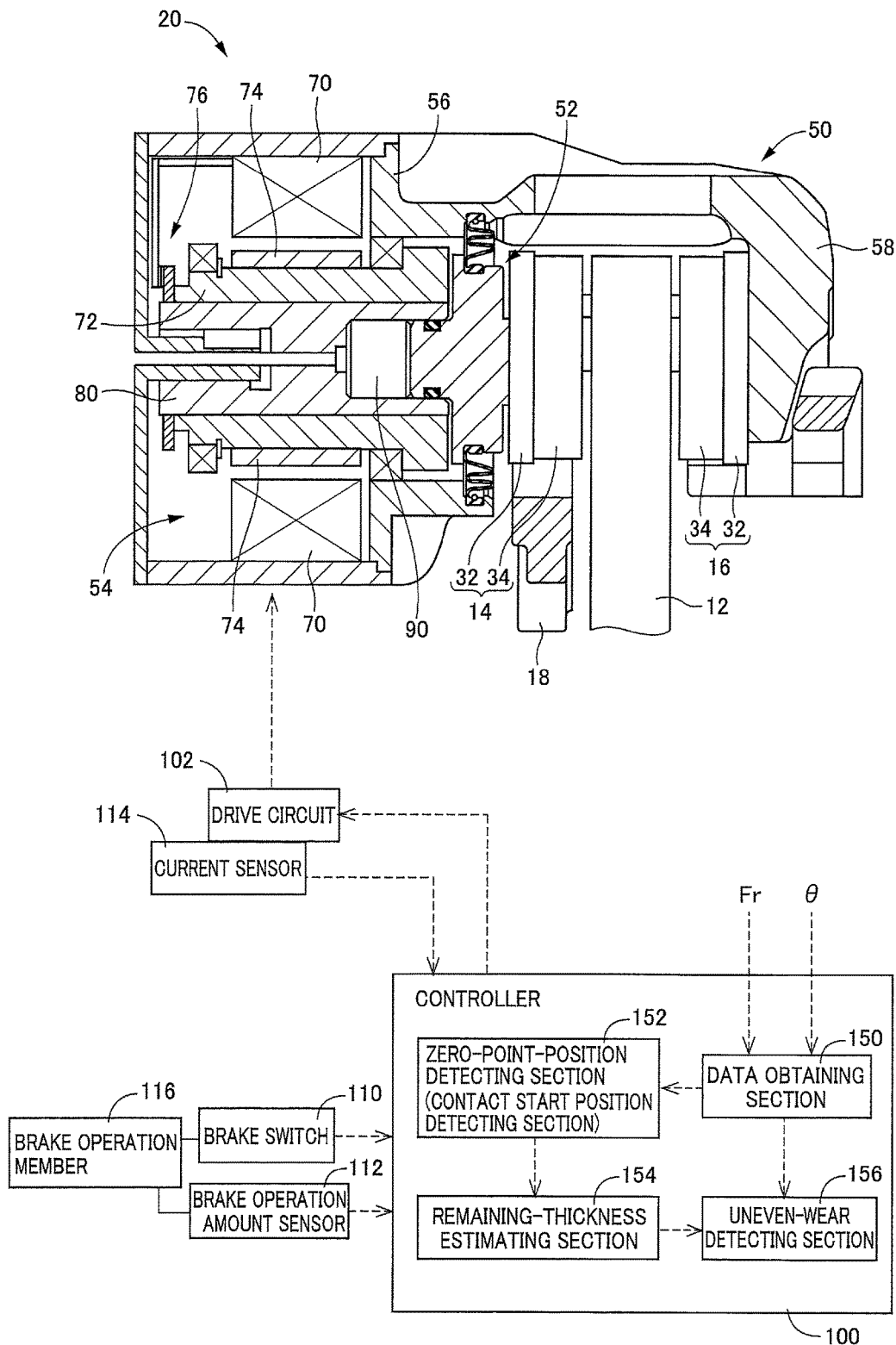
FIG. 1 is a view of a vehicle brake system according to one embodiment, the view being in partly cross section taken along the line A-A in FIG. 2.

Referring to the drawings, there will be explained below in detail one embodiment of the disclosure. It is to be understood that the disclosure is not limited to the details of the following embodiment but may be changed and modified based on the knowledge of those skilled in the art.

Structure of Brake System

Figure 2:
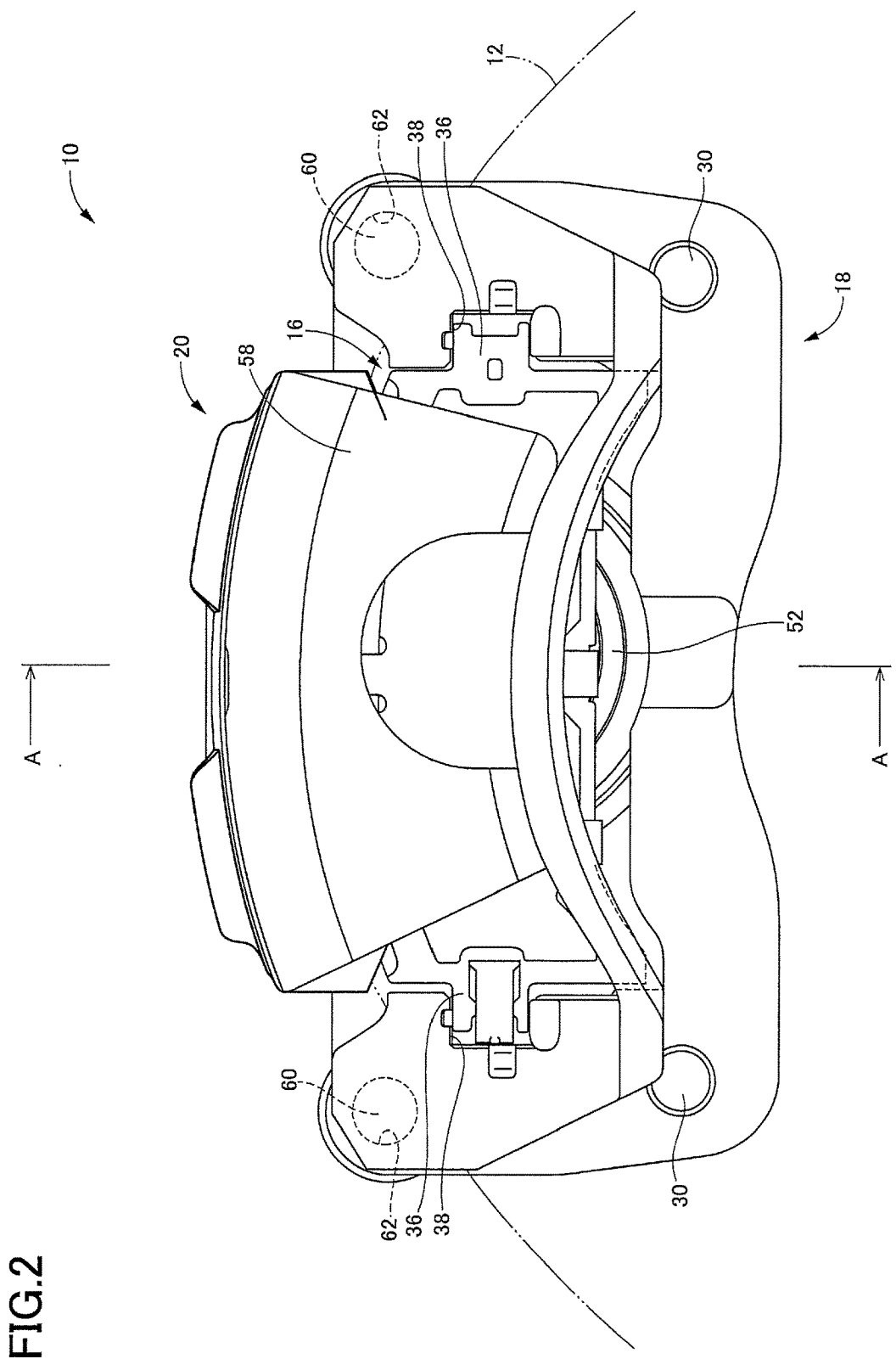
FIG. 2 is a front view of an electric brake device shown in FIG. 1.

A vehicle brake system according to one embodiment of the disclosure includes a disc brake device 10 shown in FIGS. 1 and 2 provided for each of two front wheels among four wheels of a vehicle. The disc brake device 10 provided for each front wheel functions only as a service brake. While not illustrated, a brake device provided for each of two rear wheels is an electric drum brake and functions as both of a parking brake and a service brake. The disc brake device 10 provided for each front wheel includes a disc rotor 12 configured to rotate integrally with the wheel and a pair of brake pads 14, 16 disposed at a portion of the vehicle that does not rotate with the wheel (i.e., a steering knuckle not shown). The disc brake device 10 is configured to generate a braking force by friction of the disc rotor 12 and the brake pads 14, 16. The disc brake device 10 is constituted by the disc rotor 12, the brake pads 14, 16, a mounting bracket 18 (hereinafter simply referred to as "mounting 18" where appropriate) provided at the steering knuckle and holding the brake pads 14, 16 such that the brake pads 14, 15 are movable toward and away from the disc rotor 12, and a caliper 20 supported by the mounting 18.

The mounting 18 is fixed to the steering knuckle by two bolts 30 so as to straddle the outer circumferential end of the disc rotor 12. Each of the brake pads 14, 16 held by the mounting 18 is constituted by a friction member 34 and a backing metal member 32 to which the friction member 34 is fixed. The backing metal member 32 of each brake pad 14, 16 has two protruding portions 36 respectively formed at its opposite ends in the circumferential direction of the disc rotor 12. The mounting 18 has: a pair of recessed portions 38 formed at a portion thereof located on an inner side of the disc rotor 12, namely, located near to a central portion of the vehicle body in the vehicle width direction; and a pair of recessed portions 38 formed at a portion thereof located on an outer side of the disc rotor 12, namely, located near to the wheel. The mounting 18 holds the brake pads 14, 16 such that the protruding portions 36 of the backing metal member 32 of each brake pad 14, 16 are fitted in the corresponding pair of recessed portions 38 of the mounting 18. In this arrangement, the brake pads 14, 16 are held by the mounting 18 such that the friction member 34 of each brake pad 14, 16 is opposed to the disc rotor 12 and is movable toward and away from the disc rotor 12.

As shown in FIG. 2, the caliper 20 is supported by the mounting 18 so as to straddle the disc rotor 12 and the pair of brake pads 14, 16. The caliper 20 includes a caliper main body 50, a piston 52 as a driven member, and a motor 54 configured to move the piston 52 forward and backward. The caliper main body 50 includes a housing portion 56 in which the piston 52 and the motor 54 are housed and an arm portion 58 that extends from the housing portion 56. A pair of slide pins 60 is fixed to the caliper main body 50 so as to extend in a direction of extension of a rotation axis of the disc rotor 12. (This direction will be hereinafter simply referred to as "rotation-axis direction" where appropriate.) The pair of slide pins 60 is inserted in a pair of slide holes 62 formed in the mounting 18, so that the caliper 20 is supported by the mounting 18 such that the caliper main body 50 is movable in the rotation-axis direction. In the state in which the caliper 20 is supported by the mounting 18, the piston 52 is located near the brake pad 14 that is held by the mounting 18 on the inner side of the disc rotor 12, and the distal end of the arm portion 58 is located near the brake pad 16 held by the mounting 18 on the outer side of the disc rotor 12.

The motor 54 includes a plurality of coils 70 disposed so as to be fixed to an inner surface of the housing portion 56 of the caliper main body 50, a hollow motor shaft 72 rotatably held by the housing portion 56, and a plurality of permanent magnets 74 fixed to an outer circumference of the motor shaft 72 so as to be opposed to the coils 70. The motor 54 is a three-phase DC brushless motor in which the coils 70 function as a stator and the permanent magnets 74 function as a rotor. In the housing portion 56, a rotation angle sensor 76 is provided for detecting a rotation angle of the motor shaft 72, i.e., a rotation angle θ of the motor 54.

An internal thread is formed on an inner circumferential surface of the motor shaft 72. An external thread is formed on an outer circumferential surface of a shaft portion 80 of the piston 52. The internal thread of the motor shaft 72 and the external thread of the piston 52 are held in engagement with each other through a plurality of balls. The motor shaft 72 and the piston 52 constitute a ball screw mechanism. When the motor shaft 72 is rotated, the piston 52 is moved in its axis direction, namely, in the rotation-axis direction of the disc rotor 12. Specifically, when the motor 54 is rotated in a forward direction, the piston 52 is moved forward toward the brake pad 14, namely, toward the right side in FIG. 1. When the motor 54 is rotated in a reverse direction, the piston 52 is moved backward so as to be spaced apart from the brake pad 14.

The piston 52 is provided with an axial-force sensor 90 configured to detect a force applied to the piston 52. That is, a pressing force F, which is a force of the piston 52 to press the brake pad 14, is detectable by the axial-force sensor 90.

In the vehicle brake system, the disc brake device 10 is controlled by an electronic brake control unit 100 (hereinafter referred to as "ECU100" where appropriate) as a controller. The ECU 100 functions as a wear detector as later explained. The ECU 100 is constituted mainly by a computer including a CPU, a ROM, a RAM, etc. The motor 54 and other components are connected to the ECU 100 via a drive circuit 102. The rotation angle sensor 76 and the axial-force sensor 90 indicated above are connected to the brake ECU 100. Further, a brake switch 110, a brake operation amount sensor 112, and a current sensor 114 configured to detect an electric current that flows through the motor 54 are also connected to the brake ECU 100. The brake switch 110 is for detecting whether a brake operation member 116 operable by a driver is in an operated state or in a non-operated state. The brake operation amount sensor 112 is for detecting an operation stroke of the brake operation member 116.

Operation of Disc Brake Device

There will be briefly explained an operation of the disc brake device 10 constructed as described above. When the driver performs an operation to advance the brake operation member 116, an electric current is supplied to the motor 54 based on a command of the ECU100 to generate a braking force. When the motor 54 is rotated in the forward direction, the piston 52 is moved forward and the brake pad 14 is pressed onto the disc rotor 12. Further, the caliper main body 50 is moved backward relative to the piston 52, so that the brake pad 16 is pressed onto the disc rotor 12 by the arm portion 58. That is, the disc rotor 12 is sandwiched by the pair of brake pads 14, 16. Consequently, there is applied, to the wheel, a braking force in accordance with a force by which the pair of brake pads 14, 16 are pressed onto the disc rotor 12, so that the wheel is restrained from being rotated. The braking force is controlled by controlling the electric current supplied to the motor 54 in the following manner. That is, a target pressing force, which is a target of a force of the piston 52 to press the brake pad 14, is determined based on the operation stroke of the brake operation member 116 detected by the brake operation amount sensor 112, and so on, and the supply current to the motor 54 is controlled such that the detected value of the axial-force sensor 90 becomes closer to the determined target pressing force.

On the other hand, when the driver performs an operation to retract the brake operation member 116, the supply current to the motor 54 is reduced to reduce the braking force, and the pressing force of the piston 52 is accordingly reduced. That is, the backward movement of the piston 52 is allowed, whereby the brake pads 14, 16 are allowed to be spaced apart from the disc rotor 12.

When controlling the motor 54, there is utilized a zero-point position at which the piston 52 is located when the braking force starts to increase, namely, a contact start position at which the piston 52 is located when both of the brake pads 14, 16 start to contact the disc rotor 12. For instance, the motor 54 is controlled such that the piston 52 is returned to the zero-point position at the time of start of the brake operation so as not to allow a delay in generation of the braking force.

Detection of Wear of Brake Pads

In the present brake system, there is executed an inspection process of the brake device 10, specifically, a process of detecting wear of the brake pads 14, 16 (wear detecting process). The wear detecting process of the brake pads 14, 16 will be hereinafter explained in detail.

(a) Wear Degree Detecting Process

In the present brake system, a wear degree of the pair of brake pads 14, 16 is detected, and a warning is issued when the detected wear degree is larger than a predetermined condition. Specifically, the zero-point position at the present moment is detected every time the brake operation is performed (i.e., detecting step of detecting a zero-point position). As a method of detecting the zero-point position, various methods such as those disclosed in Japanese Patent No. 4191871 may be employed, and a detailed explanation of the detecting method is omitted.

Figure 3:
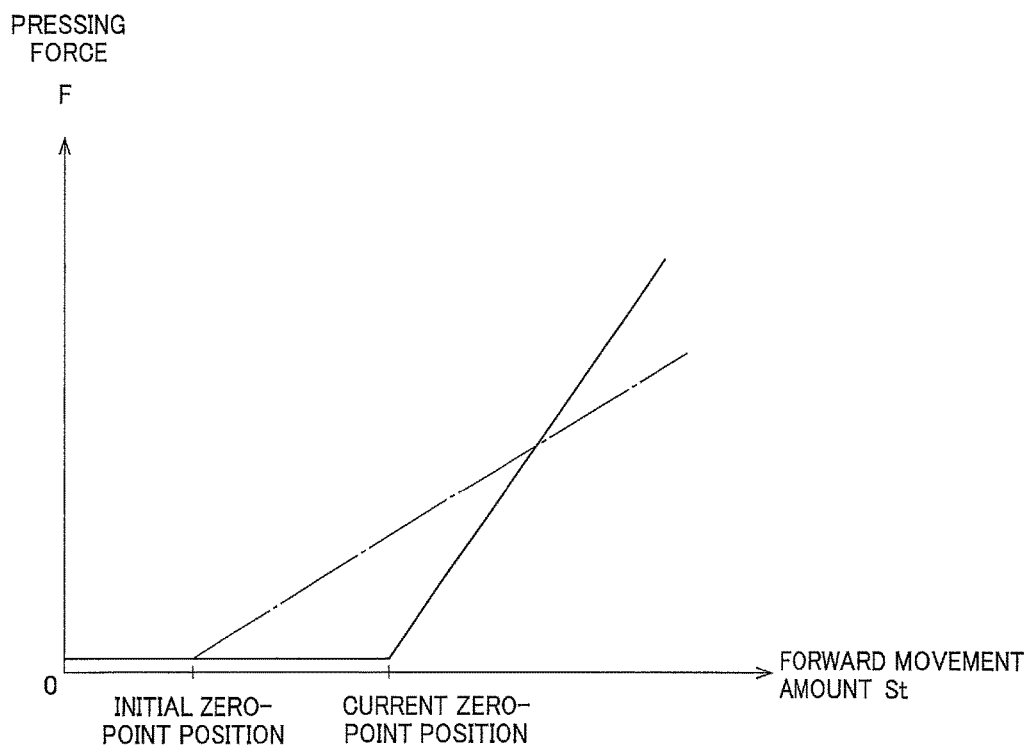
FIG. 3 is a graph showing a relationship between a forward movement amount of a piston and a pressing force by which the piston presses a friction member in a state in which the friction member is not worn: and a relationship therebetween in a state in which the friction member is worn.

As shown in FIG. 3, the zero-point position is shifted forward with an increase in a wear amount of the brake pads 14, 16. In the present brake system, a remaining thickness t of the brake pads 14, 16 is estimated based on: an initial zero-point position which is the zero-point position in a state in which the brake pads 14, 16 are not worn; and a current zero-point position which is the zero-point position at the present moment (i.e., estimating step of estimating a remaining thickness of the friction member). In an instance where the remaining thickness t of the brake pads 14, 16 is smaller than a threshold thickness $t_0$, a warning is issued.

(b) Uneven-Wear Detecting Process

Figure 4A:
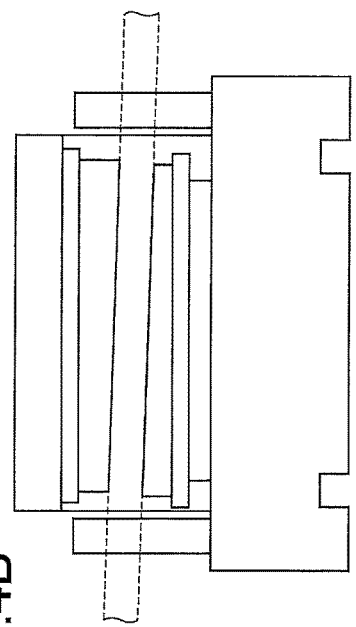
FIGS. 4A-4D are schematic views each showing a state in which the friction member of the electric brake device suffers from uneven wear.

In an instance where one of the protruding portions 36 of the brake pad 14 adheres to the corresponding recessed portion 38 of the mounting 18, the brake pad 14 falls in a state shown in FIG. 4A, for example. In an instance where one of the slide pins 60 fails to slide in the corresponding slide hole 62, the brake pads 14, 16 fall in a state shown in FIG. 4C, for example. In these instances, the brake pads 14, 16 incline with respect to the disc rotor 12, so that the brake pads 14, 16 are not evenly worn, but unevenly worn.

Figure 4B:
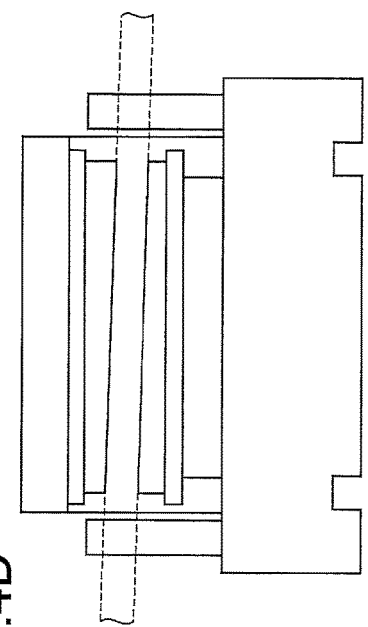
Figure 4C:
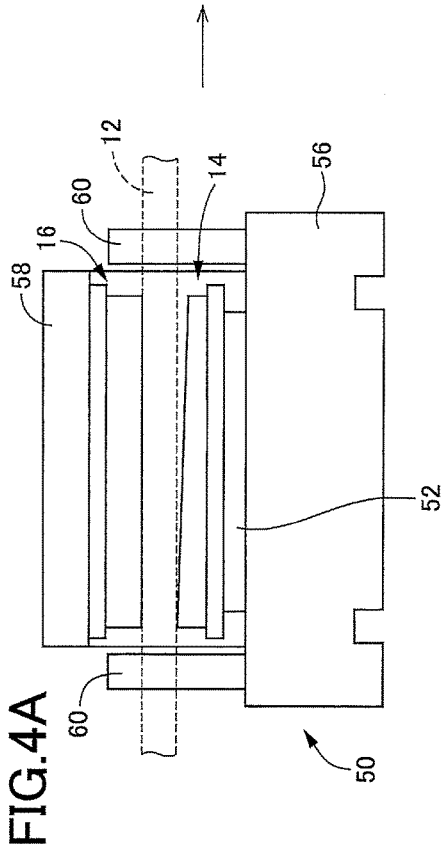
Figure 4D:
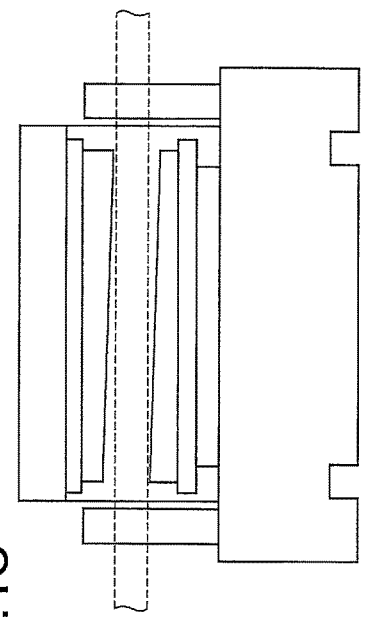

In an instance where the brake pads 14, 16 is suffering from uneven wear, the brake pads 14, 16 come into contact with the disc rotor 12 initially at portions thereof at which the remaining thickness of the brake pads 14, 16 is the largest, and an area of contact of the brake pads 14, 16 with the disc rotor 12 gradually increases from the state shown in FIG. 4A to a state shown in FIG. 4B or from the state shown in FIG. 4C to a state shown in FIG. 4D. In this instance, the zero-point position detected at the present moment corresponds to the zero-point position detected when the brake pads 14, 16 start to contact the disc rotor 12 at the portions thereof having the largest remaining thickness, and the remaining thickness t is estimated based on that zero-point position. In this instance, even though the thickness of other portion of each brake pad 14, 16 is reduced to an extent smaller than the largest remaining thickness, there is a risk that the fact is not detected or recognized.

In the vehicle brake system, therefore, it is determined whether the brake pads 14, 16 is suffering from uneven wear, and a warning is issued if the brake pads 14, 16 are suffering from uneven wear. There will be hereinafter explained in detail a process for detecting uneven wear of the brake pads 14, 16 (uneven-wear detecting process).

In the process of detecting uneven wear of the brake pads 14, 16, an amount St of a forward movement (forward movement amount St) of the piston 52, specifically, a position of the piston 52 with respect to the caliper main body 50, is obtained, based on the detection result of the rotation angle sensor 76, and an actual pressing force Fr detected by the axial-force sensor 90 is obtained (i.e., data obtaining step). The process of detecting uneven wear of the brake pads 14, 16 is executed by comparing: a relationship (indicated by the solid line in FIG. 5) between the obtained forward movement amount St and actual pressing force Fr; and a relationship (indicated by the long dashed short dashed line in FIG. 5) between a forward movement amount St and an estimated pressing force Fe in a case where it is supposed that the thickness of the brake pads 14, 16 is equal to the remaining thickness tin a state in which the brake pads 14, 16 are evenly worn.

Figure 5:
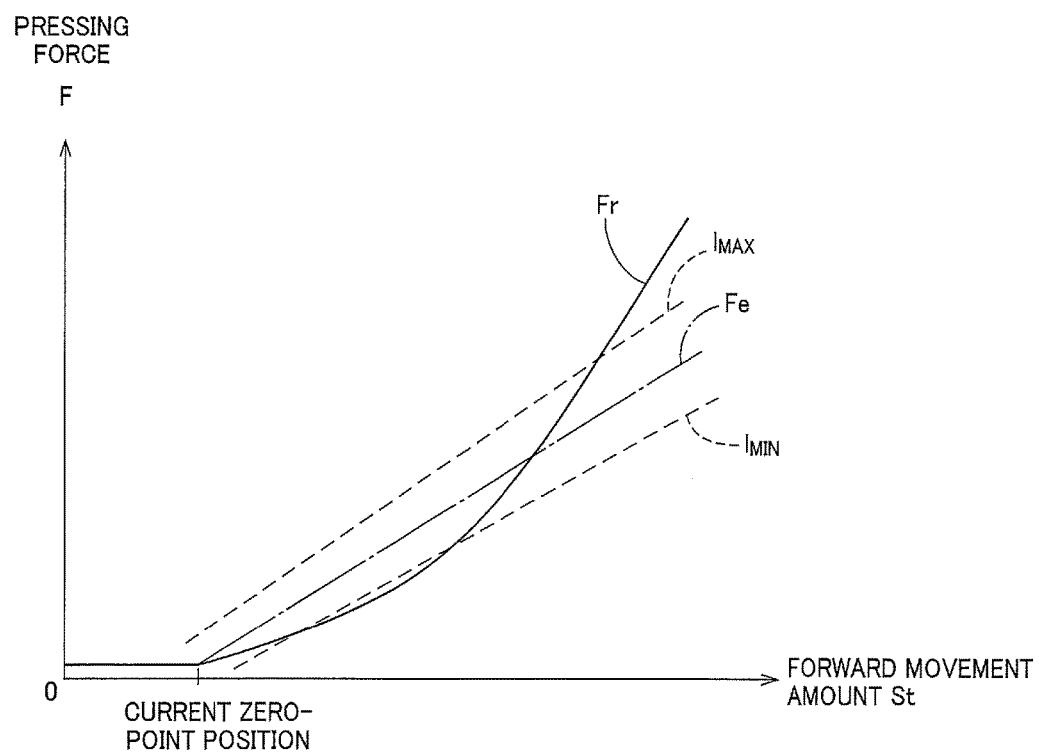
FIG. 5 is a graph showing a relationship between the forward movement amount and the pressing force in a state in which the friction member suffers from uneven wear.

When the brake pads 14, 16 are unevenly worn, the area of contact of the brake pads 14, 16 with the disc rotor 12 gradually increases as the piston 52 moves forward from the zero-point position. That is, as shown in FIG. 5, the actual pressing force Fr increases more gently than the estimated pressing force Fe as the piston 52 moves forward from the zero-point position. In other words, an actual change gradient, which is a change of the actual pressing force Fr with respect to a change of the forward movement amount St, increases as the piston 52 moves forward from the zero-point position. The actual change gradient is, however, smaller than an estimated change gradient which is a change of the estimated pressing force Fe with respect to a change of the forward movement amount St. In the present brake system, it is determined that at least one of the brake pads 14, 16 is suffering from uneven wear where the disc brake device 10 is in a situation in which the actual change gradient is smaller than the estimated change gradient when the actual change gradient is increasing in accordance with the forward movement of the piston 52 from the zero-point position.

In the present brake system, an allowable range for determination of uneven wear of the brake pads 14, 16 is set based on the relationship between the forward movement amount St and the estimated pressing force Fe with consideration given to thermal expansion of the brake pads 14, 16, detection errors of the sensors, and so on. Specifically, an upper limit line $l_{MAX}$ and a lower limit line $l_{MIN}$ indicated by the respective dashed lines in FIG. 5 are set. When the actual pressing force Fr, which is obtained for the forward movement amount St, is smaller than a value indicated by the lower limit line $l_{MIN}$, it is estimated that the disc brake device 10 is in the situation in which the actual change gradient is smaller than the estimated change gradient, and it is determined that at least one of the brake pads 14, 16 is suffering from uneven wear.

The determination as to whether the disc brake device 10 is in the situation in which the actual change gradient is smaller than the estimated change gradient is not limited to the method explained above. For instance, the actual change gradient may be obtained based on: currently obtained forward movement amount and actual pressing force; and previously obtained forward movement amount and actual pressing force, and it may be determined that at least one of the brake pads 14, 16 is suffering from uneven wear when the obtained actual change gradient is smaller than a threshold that is set based on the estimated change gradient.

Even if the brake pads 14, 16 are unevenly worn, the piston 52 is moved forward against an elastic force of the brake pads 14, 16 after the entire surface of each brake pad 14, 16 has come into contact with the disc rotor 12 as shown in FIGS. 4B and 4D. Thus, the actual change gradient becomes closer to a modulus of elasticity of the brake pads 14, 16 and consequently stops to increase, namely, becomes constant. The actual change gradient at that time, however, is larger than the estimated change gradient if the brake pads 14, 16 are worn to a considerable degree. In the present brake system, it is determined that at least one of the brake pads 14, 16 is suffering from uneven wear when the disc brake device 10 is in a situation in which the actual change gradient, which stops to increase or becomes constant even though the piston 52 moves forward, is larger than the estimated change gradient.

In the brake system, when the actual pressing force Fr obtained for the forward movement amount St is larger than a value indicated by the upper limit line $l_{MAX}$, it is estimated that the disc brake device 10 is in the situation in which the actual change gradient is larger than the estimated change gradient and it is determined that at least one of the brake pads 14, 16 is suffering from uneven wear.

The determination as to whether the disc brake device 10 is in the situation in which the actual change gradient is larger than the estimated change gradient is not limited to the method explained above. For instance, the actual change gradient may be continuously obtained based on: currently obtained forward movement amount and actual pressing force; and previously obtained forward movement amount and actual pressing force. When the continuously obtained actual change gradient does not substantially change, namely, becomes substantially constant, the actual change gradient at that time may be compared with a threshold which is set based on the estimated change gradient. That is, it may be determined that at least one of the brake pads 14, 16 is suffering from uneven wear when the actual change gradient is larger than the threshold.

In the present brake system, it is determined that there is a risk of uneven wear of the brake pads 14, 16 when one of the following two conditions is satisfied: (I) when the actual change gradient is increasing as the piston 52 moves forward from the zero-point position, the disc brake device 10 is in the situation in which the actual change gradient is smaller than the estimated change gradient; and (II) when the actual change gradient stops to increase or becomes constant even though the piston 52 moves forward, the disc brake device 10 is in the situation in which the actual change gradient is larger than the estimated change gradient. It may be determined that there is a risk of uneven wear of the brake pads 14, 16 when both of the two conditions (I) and (II) are satisfied.

Control Program

Figure 6:
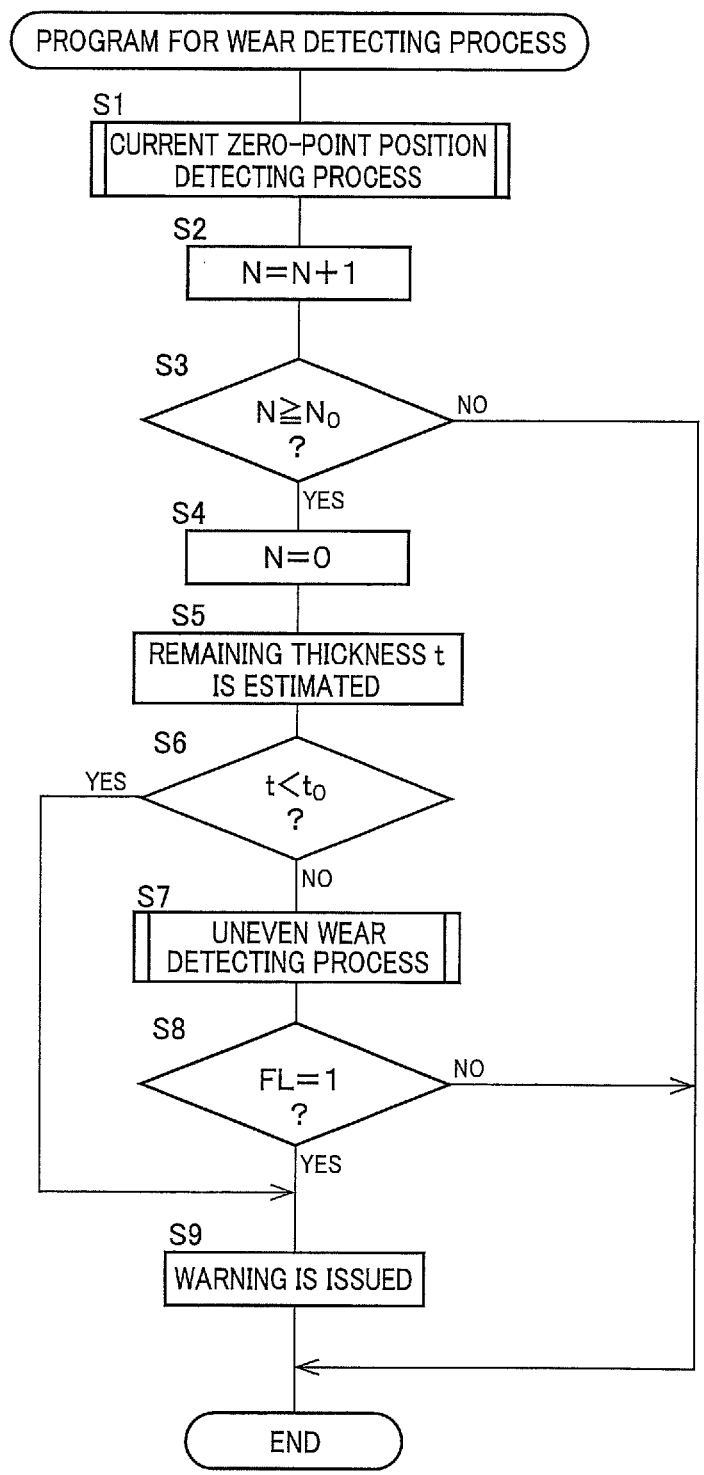
FIG. 6 is a flowchart showing a program for a wear detecting process executed by an electronic brake control unit that controls the vehicle brake system of FIG. 1.

The wear detecting process for the brake pads 14, 16 is executed by execution of a program for the wear detecting process indicated by a flowchart of FIG. 6. This program is executed when the brake switch 110 is placed in an ON state. In this program, the zero-point position at the present moment is detected at Step 1 (hereinafter "Step" is abbreviated as "S"). Subsequently, it is determined whether the wear detecting process needs to be executed based on the number of performed brake operations. Specifically, a counter N is counted up at S2, and it is determined at S3 whether the value of the counter N is not smaller than a threshold $N_0$. In other words, the wear detecting process at S4 and subsequent steps is executed when the number of times of brake operations performed after the previous wear detecting process becomes equal to or larger than the threshold $N_0$. The determination at S3 may be made based on a running distance, an elapsed time, the number of times of startup of the vehicle, after the previous wear detecting process or may be made based on a magnitude of the load that acted on the brake device 10.

In the wear detecting process, the counter N is reset at S4. At S5, the remaining thickness t of the brake pads 14, 16 is estimated based on the current zero-point position detected at 51 and the initial zero-point position which is the zero-point position when the brake pads 14, 16 are not worn. If it is determined at S6 the remaining thickness t is smaller than the threshold thickness $t_0$, this means that the brake pads 14, 16 are considerably worn. In this case, a warning is issued at S9.

Figure 7:
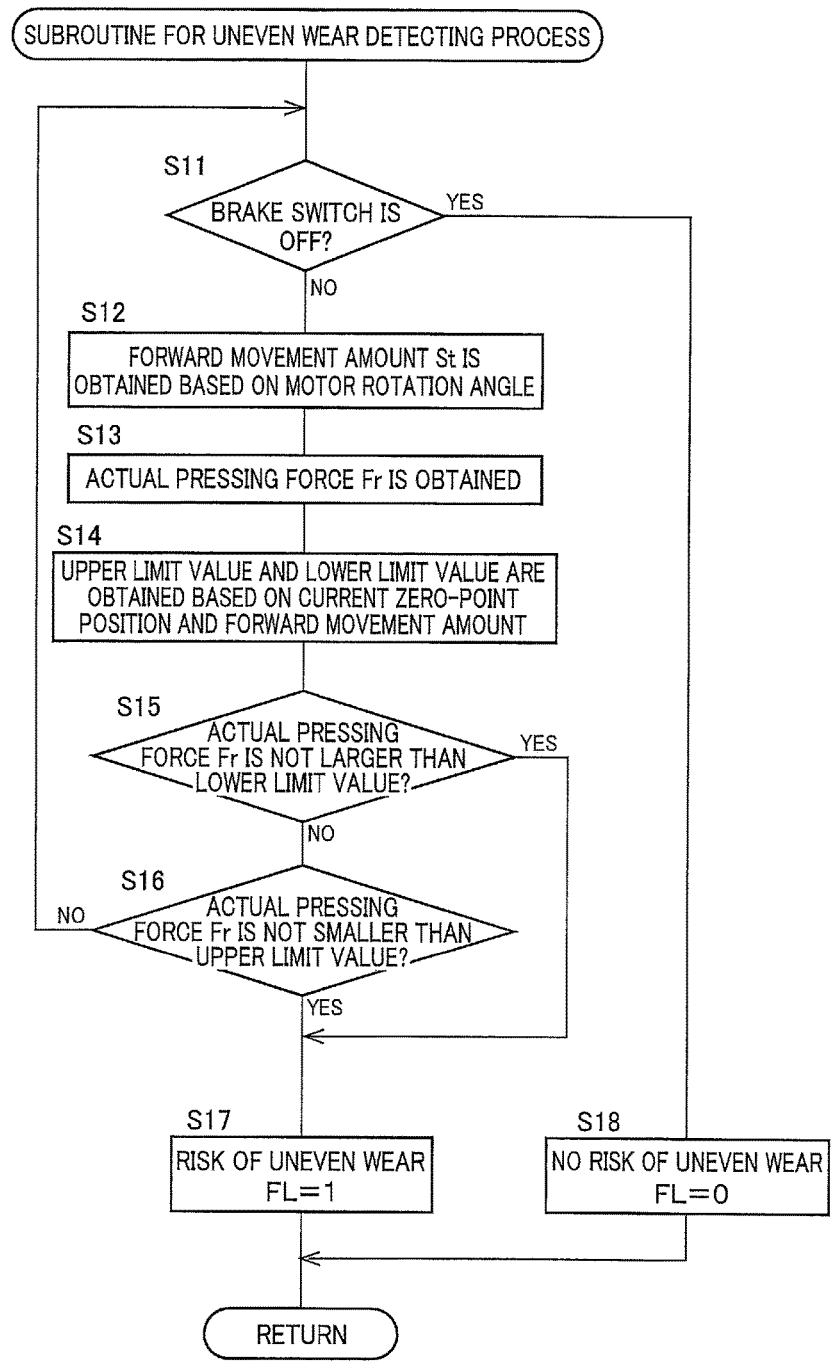
FIG. 7 is a flowchart showing a subroutine for an uneven-wear detecting process executed in the program for the wear detecting process shown in FIG. 6.

When it is determined at S6 that the remaining thickness t is not smaller than the threshold thickness $t_0$ and no warning needs to be issued, a process for detecting uneven wear of the brake pads 14, 16 (uneven-wear detecting process) is executed at S7. The uneven-wear detecting process is executed by execution of a subroutine for the uneven-wear detecting process indicated by a flowchart of FIG. 7. In the subroutine, the forward movement amount St of the piston 52 is obtained at S12 from the motor rotation angle θ detected by the rotation angle sensor 76. At S13, the actual pressing force Fr by which the piston 52 actually presses the brake pad 14 is obtained from the detection result of the axial-force sensor 90. At S14, an upper limit value and a lower limit value which are set based on the estimated pressing force Fe are obtained based on: the forward movement amount St obtained at S12; and the current zero-point position and the remaining thickness t of the brake pads 14, 16 obtained in the program for the wear detecting process. The ROM stores various map data, and the upper limit value and the lower limit value are obtained utilizing the map data. Specifically, the estimated change gradient is initially obtained based on the remaining thickness t. The estimated change gradient is defined as a change of the estimated pressing force Fe with respect to a change of the forward movement amount St in a case where it is supposed that the thickness of the brake pads 14, 16 is equal to the remaining thickness t in a state in which the brake pads 14, 16 are evenly worn. Then a straight line that extends from the current zero-point position at the estimated change gradient is obtained as a relationship between the forward movement amount St and the estimated pressing force Fe in the case where it is supposed that the thickness of the brake pads 14, 16 is equal to the remaining thickness t in the state in which the brake pads 14, 16 are evenly worn. Subsequently, the estimated pressing force Fe is obtained for the forward movement amount St obtained at S12. The upper limit value and the lower limit value are set for the estimated pressing force Fe. Thus, the upper limit value and the lower limit value are obtained.

Subsequently, it is determined at S15 whether the actual pressing force Fr is not larger than the lower limit value, and it is determined at S16 whether the actual pressing force Fr is not smaller than the upper limit value. When the actual pressing force Fr is not larger than the lower limit value or when the actual pressing force Fr is not smaller than the upper limit value, there is a risk of uneven wear of the brake pads 14, 16. In this case, the control flow goes to S17 at which a flag value of an uneven-wear flag FL is set to 1. On the other hand, when a negative decision is made in both of S15 and S16, it is determined that there is no risk of uneven wear. In this case, the processing from S12 to S16 is repeated until the brake operation ends. When the brake operation ends without detecting uneven wear of the brake pads 14, 16 and the brake switch 110 is placed in an OFF state, the flag value of the uneven-wear flag FL is set to 0 at S18. Thus, the subroutine for the uneven-wear detecting process ends.

When the subroutine for the uneven-wear detecting process ends, the flag value of the uneven-wear flag FL is confirmed at S8 of the program for the wear detecting process. When the flag value is 1 and there is the risk of uneven wear of the brake pads 14, 16, a warning is issued at S9 and one execution of the program for the wear detecting process ends. On the other hand, when the flag value is 0, S9 is skipped and one execution of the program for the wear detecting process ends.

Functional Structure of Controller

The ECU 100 that executes the control described above may be considered to have various functional sections that execute the processing explained above. As shown in FIG. 1, the ECU 100 includes (A) a data obtaining section 150 configured to obtain the forward movement amount St which corresponds to the distance by which the piston 52 moves forward and the pressing force Fr by which the piston 52 presses the brake pads 14, 16, (B) a zero-point-position detecting section 152, as a contact-start-position detecting section, configured to detect the zero-point position (the contact start position) at which the piston 52 is located when the brake pads 14, 16 start to contact the disc rotor 12, (C) a remaining-thickness estimating section 154 configured to estimate the remaining thickness t of the brake pads 14, 16 based on the zero-point position detected by the zero-point-position detecting section 152, and (D) an uneven-wear detecting section 156 configured to detect uneven wear of the brake pads 14, 16 indicative of the state in which the brake pads 14, 16 are unevenly worn by comparing: the relationship between the forward movement amount St and the pressing force Fr which are obtained by the data obtaining section 150; and the relationship between the forward movement amount St and the pressing force Fe in the case where it is supposed that the thickness of the brake pads 14, 16 is equal to the remaining thickness t that would be estimated by the remaining-thickness estimating section 154 in the state in which the brake pads 14, 16 are evenly worn.

In the ECU100 of the present vehicle brake system, the data obtaining section 150 is constituted by a portion that executes S12 and S13 of the subroutine for the uneven-wear detecting process. The zero-point-position detecting section 152 is constituted by a portion that executes 51 of the program for the wear detecting process. The remaining-thickness estimating section 154 is constituted by a portion that executes S5 of the program for the wear detecting process. The uneven-wear detecting section 156 is constituted by a portion that executes S14 and subsequent steps of the subroutine for the uneven-wear detecting process.

What is claimed is:

1. A vehicle brake system, comprising:
    an electric brake device including (a) a friction member, (b) a rotor configured to rotate with a wheel, (c) a motor as a power source, and (d) a driven member configured to be moved forward and backward by the motor, the electric brake device being configured to generate a braking force such that the driven member is moved forward by the motor so as to press the friction member and the friction member is brought into contact with the rotor; and
    a wear detector configured to detect wear of the friction member and including (A) a data obtaining section configured to obtain an amount of a forward movement of the driven member corresponding to a distance by which the driven member moves forward and a pressing force by which the driven member presses the friction member, (B) a contact-start-position detecting section configured to detect a contact start position at which the driven member is located when the friction member starts to contact the rotor, and (C) a remaining-thickness estimating section configured to estimate a remaining thickness of the friction member based on the contact start position detected by the contact-start-position detecting section,
    wherein the wear detector further includes an uneven-wear detecting section configured to detect uneven wear of the friction member indicative of a state in which the friction member is unevenly worn, by comparing: a relationship between the amount of the forward movement and the pressing force obtained by the data obtaining section; and a relationship between an amount of the forward movement and a pressing force in a case where it is supposed that a thickness of the friction member is equal to the remaining thickness that would be estimated by the remaining-thickness estimating section in a state in which the friction member is evenly worn.

2. The vehicle brake system according to claim 1, wherein a change of the obtained pressing force with respect to a change of the obtained amount of the forward movement is defined as an actual change gradient, and a change of the pressing force with respect to a change of the amount of the forward movement in the case where it is supposed that the thickness of the friction member is equal to the remaining thickness that would be estimated by the remaining-thickness estimating section in the state in which the friction member is evenly worn is defined as an estimated change gradient, and wherein the uneven-wear detecting section determines that there is a risk of uneven wear of the friction member when the electric brake device is in a situation in which the actual change gradient, which becomes constant after having increased in accordance with the forward movement of the driven member from the contact start position, is larger than the estimated change gradient.

3. The vehicle brake system according to claim 2, wherein the uneven-wear detecting section estimates that the electric brake device is in the situation in which the actual change gradient is larger than the estimated change gradient and determines that there is the risk of uneven wear of the friction member, when the pressing force obtained by the data obtaining section becomes larger than an upper limit value that is set based on the relationship between the amount of the forward movement and the pressing force in the case where it is supposed that the thickness of the friction member is equal to the remaining thickness that would be estimated by the remaining-thickness estimating section in the state in which the friction member is evenly worn.

4. The vehicle brake system according to claim 1, wherein a change of the obtained pressing force with respect to a change of the obtained amount of the forward movement is defined as an actual change gradient, and a change of the pressing force with respect to a change of the amount of the forward movement in the case where it is supposed that the thickness of the friction member is equal to the remaining thickness that would be estimated by the remaining-thickness estimating section in the state in which the friction member is evenly worn is defined as an estimated change gradient, and wherein the uneven-wear detecting section determines that there is a risk of uneven wear of the friction member when the electric brake device is in a situation in which the actual change gradient, which is increasing as the driven member moves forward from the contact start position, is smaller than the estimated change gradient.

5. The vehicle brake system according to claim 4, wherein the uneven-wear detecting section estimates that the electric brake device is in the situation in which the actual change gradient is smaller than the estimated change gradient and determines that there is the risk of uneven wear of the friction member, when the pressing force obtained by the data obtaining section becomes smaller than a lower limit value that is set based on the relationship between the amount of the forward movement and the pressing force in the case where it is supposed that the thickness of the friction member is equal to the remaining thickness that would be estimated by the remaining-thickness estimating section in the state in which the friction member is evenly worn.

6. A method of detecting wear of a friction member in an electric brake device including (a) a friction member, (b) a rotor configured to rotate with a wheel, (c) a motor as a power source, and (d) a driven member configured to be moved forward and backward by the motor, the electric brake device being configured to generate a braking force such that the driven member is moved forward by the motor so as to press the friction member and the friction member is brought into contact with the rotor, the method comprising:

obtaining an amount of a forward movement of the driven member corresponding to a distance by which the driven member moves forward and a pressing force by which the driven member presses the friction member;

detecting a contact start position at which the driven member is located when the friction member starts to contact the rotor;

estimating a remaining thickness of the friction member based on the detected contact start position; and detecting uneven wear of the friction member indicative of a state in which the friction member is unevenly worn, by comparing: a relationship between the obtained amount of the forward movement and the obtained pressing force; and a relationship between an amount of the forward movement and a pressing force in a case where it is supposed that a thickness of the friction member is equal to the remaining thickness that would be estimated in a state in which the friction member is evenly worn.

* * * * *